Figure 1:
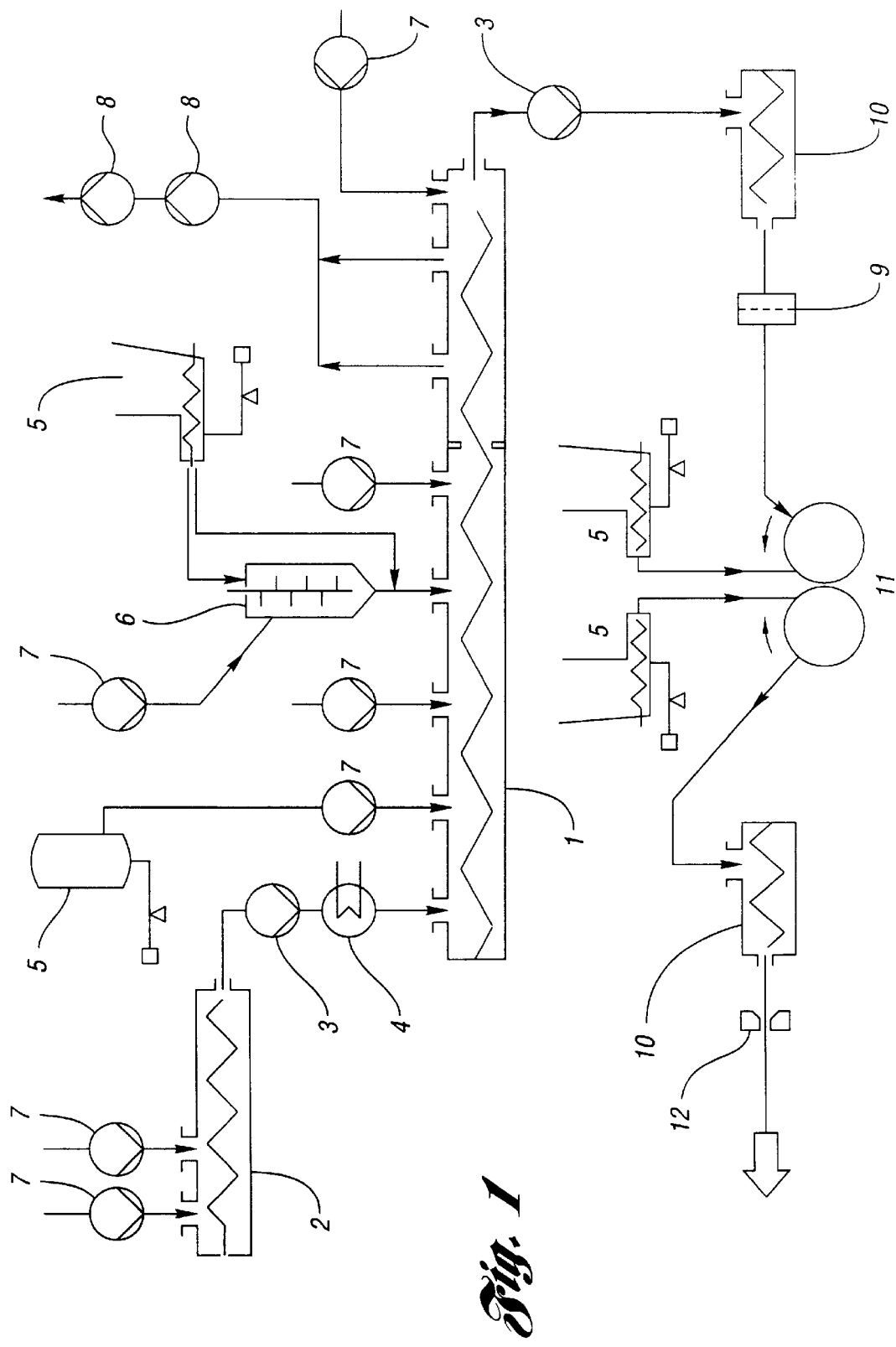

United States Patent
Heisler et al.

[11] Patent Number: 6,124,392
[45] Date of Patent: Sep. 26, 2000

[54] PROCESS FOR THE CONTINUOUS PREPARATION OF HTV SILICONE COMPOSITIONS

[75] Inventors: Manfred Heisler, Emmerting; Fridolin Stary, Burghausen; Rudolf Ratka, Burghausen; Alois Schlierf, Burghausen, all of Germany

[73] Assignee: Wacker-Chemie GmbH, Munich, Germany

[21] Appl. No.: 08/074,819

[22] PCT Filed: Jan. 16, 1992

[86] PCT No.: PCT/EP92/00080

§ 371 Date: Jun. 10, 1993

§ 102(e) Date: Jun. 10, 1993

[87] PCT Pub. No.: WO92/13694

PCT Pub. Date: Aug. 20, 1992

[30] Foreign Application Priority Data

Feb. 7, 1991 [DE] Germany .................. 41 03 602

[51] Int. Cl.$^7$ ..................... C08K 3/34
[52] U.S. Cl. .............. 524/492; 524/588; 524/860; 525/474
[58] Field of Search ............. 524/586, 860, 524/492; 525/474

[56] References Cited

U.S. PATENT DOCUMENTS 4,737,561  4/1988  Stary et al. ............... 524/860

Primary Examiner—Robert Dawson
Attorney, Agent, or Firm—Brooks & Kushman P.C.

[57] ABSTRACT

The invention relates to a process for the continuous preparation of HTV silicone compositions, which comprises mixing and homogenizing 100 parts by weight of diorgano (poly)siloxane which has a viscosity of 50 to 100,000 Pas at 25° C. with at least 20 parts by weight of finely divided silicon dioxide which has a tamped density of more than 0.01 kg/l in an oscillating single-shaft pilgrim-step kneader.

10 Claims, 1 Drawing Sheet

PROCESS FOR THE CONTINUOUS PREPARATION OF HTV SILICONE COMPOSITIONS

The invention relates to a process for the continuous preparation of hot vulcanizing silicone compositions based on diorgano(poly)siloxanes, which are called HTV (high temperature vulcanizing) silicone compositions by experts. These HTV silicone compositions differ from RTV (room temperature vulcanizing) silicone compositions in respect of the temperature during the vulcanization operation. While the HTV silicone compositions vulcanize only at a temperature elevated with respect to room temperature via a free radical reaction or addition reaction, vulcanization of one-component RTV silicone compositions even takes place at room temperature via a condensation reaction with atmospheric moisture, that is to say water. One-component RTV silicone compositions contain reinforcing fillers in amounts of not more than 10% by weight. In contrast, the content of reinforcing filler in HTV silicone compositions is at least 20% by weight. To distinguish between HTV and RTV silicone compositions, reference may also be made, for example, to Winnacker, Küchler, Volume 6, Anorganische Technologie II (Inorganic Technology II), 4th Edition, 1982, *Carl Hanser Verlag Munich Vienna,* pages 842 and 845, J. Bittera, Kautschuk, Gummi, Kunststoffe, Volume 39 No. 1/86 or J. C. Weis in Progress of Rubber Technology, edited by S. H. Morell, *Elsevier Applied Science Publishers Ltd.,* England, 1984 pages 85–106.

According to EP-A-234,226 and the corresponding U.S. Pat. No. 4,737,561, a process is known for the continuous preparation of one-component RTV silicone compositions in which the diorgano(poly)siloxane to be crosslinked, filler(s) and possibly either catalyst(s) or crosslinking agents and possibly some or all of the auxiliaries optionally to be used are combined in a first step in a continuously operating closed mixer, and in a second step the crosslinking agents and/or catalyst(s) which have not been added in the first step are metered into the resulting composition in an oscillating pilgrim-step kneader and the composition is homogenized and degassed in this kneader.

HTV silicone compositions differ from RTV silicone compositions above all in the following points:
- considerably higher viscosity of the polymers employed in the case of HTV compositions
- different type of crosslinking: HTV: peroxides RTV: tri-functional silanes
- anti structure agent: HTV: siloxane-diols RTV: silicone oils
- consistency of the compositions obtained: HTV: solid rubber RTV: pasty This different consistency can already be seen from the different methods of viscosity measurement. The Mooney viscometers customary in the rubber-processing industry are thus employed for HTV compositions, while rotary viscometers and pressing-out apparatuses are used for RTV compositions.

HTV silicone compositions according to the current prior art are therefore prepared almost exclusively discontinuously by mixing the starting substances in kneaders, internal mixers or mixing roll mills.

According to EP-B-258,159, a process is known for the continuous preparation of master mixtures in the form of homogeneous and thick pastes, to later obtain hot vulcanizable silicone elastomers, a continuous twin-screw kneader being charged with a polysiloxane base polymer and a power batch. The power batch is preferably silicone dioxide having a density of more than 0.1 kg/l.

Disadvantageously, because of the varying intake properties, product properties which are not constant with respect to time result in this process. Long mixing zones are needed to achieve a positive speck evaluation, which unavoidably leads to increased apparatus complexity and increased residence times. There is also the risk of high wear on machinery and contamination of the product by abraded metal.

The object of the invention is to provide a process for the continuous preparation of HTV silicone compositions which avoids the disadvantages of the prior art.

This object is achieved by a process for the continuous preparation of HTV silicone compositions, which comprises mixing and homogenizing 100 parts by weight of diorgano (poly)siloxane which has a viscosity of 50 to 100,000 Pas at 25° C. with at least 20 parts by weight of finely divided silicon dioxide which has a tamped density of more than 0.01 kg/l in an oscillating single-shaft pilgrim-step kneader.

It is possible to obtain HTV silicone compositions having positive product properties, such as a homogeneous and transparent appearance, good speck evaluation, constant Mooney viscosity and constant Shore A hardness, by the process according to the invention.

All those recipes for HTV silicone compositions which have previously been processed discontinuously can be processed continuously in the process according to the invention. A review of such recipes is given in Chemistry and Technology of Silicones, W. Noll, Academic Press Inc., Orlando, USA, pages 400 to 407, to which reference is expressly made in this connection.

In addition to diorgano(poly)siloxanes and finely divided silicon dioxide the HTV silicone compositions can contain other fillers, anti structure agent, peroxides and if appropriate additives, such as, for example, hot-air stabilizers, flame-proofing agents and pigments.

The non-crosslinked HTV silicone compositions obtained preferably have a Mooney viscosity (DIN 53523) of 15 to 130 Mooney units (Mooney final value, ML (1+4), 23° C.), from which, after crosslinking with peroxides and subsequent heat treatment, elastomers of Shore A hardness (DIN 53505) of preferably 15 to 110, in particular 15 to 95, result.

Diorgano(poly)siloxanes having a viscosity of 50 to 100,000 Pas, preferably 500 to 50,000 Pas, at 25° C. are used according to the invention.

The organo radicals in the diorgano(poly)siloxanes employed according to the invention are preferably methyl, vinyl, phenyl and/or trifluoroalkyl radicals. A preferred trifluoroalkyl radical is the 3,3,3-trifluoropropyl radical.

If vinyl and/or phenyl radicals are present in the chains of the diorgano(poly)siloxanes alongside methyl and/or trifluoroalkyl radicals, a preferred range for the amounts of these radicals is 0.001–30 mol %, in particular 0.001–25 mol %.

Diorgano(poly)siloxanes blocked on the ends by trimethyl-, dimethylvinyl-, methyldivinyl- and/or trivinylsiloxy groups are preferably employed. However, the use of diorgano(poly)siloxanes which are not blocked or are only partly blocked is also necessary for specific applications.

Preferred diorgano(poly)siloxanes correspond to the general formulae

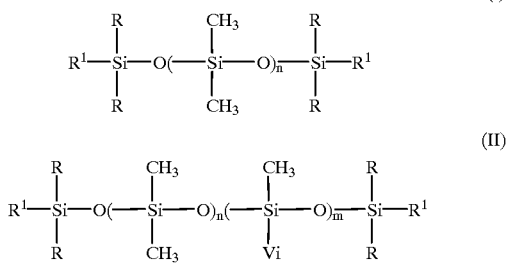

in which R denotes a methyl and/or vinyl radical, $R^1$ denotes a methyl, vinyl and/or hydroxyl radical, n lies within the limits of 500 to 10,000, preferably 2,000 to 8,000, and n+m lies within the limits of 500 to 10,000, preferably 2,000 to 8,000, with the proviso that the quotient n/m is greater than or equal to 1, preferably within the limits of 3 to 10,000.

Although not stated above, in addition to units of the formula $R_2SiO$, the diorgano(poly)siloxanes can contain up to 0.05 mol %, preferably less than 0.02 mol %, of other units, which are usually present as impurities which are more or less difficult to avoid, of the formula $SiO_{4/2}$ and $RSiO_{3/2}$, in which R is an organo radical, usually a methyl, ethyl, vinyl, phenyl and/or trifluoroalkyl radical.

The preparation of these diorgano(poly)siloxanes used according to the invention is generally known. A review of customary preparation processes is given in Polymerreaktionen und reaktives Aufarbeiten in kontinuierlichen Maschinen (Polymer reactions and reactive working up in continuously operating machines), VDI-Verlag GmbH, Düsseldorf 1988, on pages 211–224.

Finely divided silicon dioxide according to the invention has a tamped density (ISO 787/11) of more than 0.01 kg/l, preferably in the range from 0.02 to 0.4 kg/l. Examples of finely divided silicon dioxide are pyrogenic and/or precipitated silicon dioxide, which can be hydrophobized by treatment, for example, with organo-silanes, -silazanes or -siloxanes or by etherification of hydroxyl groups to alkoxy groups.

Finely divided silicon dioxide which is prepared according to EP-A-0,378,785, to which reference is expressly made in this connection, exhibits particularly favorable incorporation properties. This preparation is a process for hydrophobizing a solid which contains Si—OH groups and has a tamped density usually of less than 0.1 kg/l by reaction of a hydrophobizing agent based on organosilicon compounds with a particulate solid containing Si—OH groups while the reaction mixture is simultaneously exposed to mechanical stress, which comprises employing 5 to 50% by weight of the particulate solid containing Si—OH groups based on the total weight of the reaction mixture comprising particulate solid and hydrophobizing agent. A preferred hydrophobizing agent for this process comprises 70 to 89% by weight of hexamethyldisiloxane and/or trimethylsilanol, 10 to 30% by weight of hexamethyldisilazane and/or divinyltetramethyldisilazane and 1 to 5% by weight of water, the data in % by weight relating to the total weight of the hydrophobizing agent.

Wetting with diorgano(poly)siloxane and/or low viscosity polymethylsiloxanediol, as described below as anti structure agent dusifying tamped of preferably 0.03 to 0.5 kg/l of finely divided hydrophobic silicon dioxide having a tamped density of less than 0.1 kg/l may similarly be of advantage. Wetting and the resulting increase in the damped density of finely divided silicon dioxide is carried out with preferably 30 to 100%, in particular 50 to 100%, of the parts by weight of anti structure agent present in the composition of the HTV silicone compositions prepared according to the invention. The temperature here is preferably less than 180° C., in particular 10 to 120° C.

If the receipe requires the use of hydrophobic silicon dioxide, hydrophobic silicon dioxide having a carbon content of more than 1% by weight, based on the total weight of hydrophobic silicon dioxide, in particular 2 to 8% by weight, and tamped densities of more than 0.05 kg/l, in particular 0.2 to 0.4 kg/l, is preferably used.

Further examples of reinforcing fillers which are to be used if appropriate and have a BET surface area (DIN 66131) of preferably more than 50 $m^2/g$ are finely divided hydrophobic silicon dioxide having a tamped density of less than 0.1 kg/l, preferably 0.01–0.09 kg/l, furnace black and acetylene black. The preferred amounts of these substances are 0 to 60 parts by weight.

Non-reinforcing fillers, such as quartz, diatomaceous earth, calcium silicate, zirconium silicate, zeolites, metal oxide powders, such as aluminum oxide, titanium oxide, iron oxide or zinc oxide, barium silicate, barium sulfate, calcium carbonate, gypsum and powders of plastic, such as polyacrylonitrile powder, can furthermore be used. Other fillers are fibrous components, such as glass fibers and fibers of plastic. The BET surface area of these fillers is as a rule less than 50 $m^2/g$.

If anti structure agent are employed, these are preferably polydimethylsiloxanediols having a viscosity of preferably 10 to 200 mPas, in particular 20 to 150 mPas, at 25° C. They can contain phenyl groups, and vinyl groups can also be present in the chain of these polydimethylsiloxanediols, in particular for influencing the hardness of the vulcanized product, the density of vinyl groups being determined via the iodine number (DIN 53241). The iodine number is preferably 1 to 75 g of iodine per 100 g of siloxanediol, in particular 7 to 70 g per 100 g.

The preparation of these polydimethylsiloxane-diols is generally known and is described, for example, in A. Tomanek, Silicone und Technik (Silicones and Technology), Hanser Verlag on pages 20 to 22.

If necessary, pigments and crosslinking agents, preferably from the group of alkyl and aroyl peroxides, are also incorporated. Examples of alkyl peroxides are dicumyl peroxide, di-tert.-butyl peroxide and 2,5-di-tert.-butylperoxy-2,5-dimethylhexane. Examples of aroyl peroxides are benzoyl peroxide, bis(2,4-dichlorobenzoyl) peroxide and bis(4-methylbenzoyl) peroxide.

Preferred formulations of the HTV silicone compositions prepared according to the invention are as follows:

100 parts by weight of diorgano(poly)siloxane, 20 to 200, preferably 30 to 100, parts by weight of finely divided silicon dioxide having a tamped density of more than 0.01 kg/l, 0 to 100, preferably 0 to 60, parts by weight of other filler, 0 to 30, preferably 0 to 20, parts by weight of anti structure agent, 0 to 7, preferably 0 to 3, parts by weight of crosslinking agent and 0 to 30, preferably 0 to 10, parts by weight of other additives.

For all the abovementioned constituents, it is possible to use mixtures of individual representatives of the particular constituents.

Two- to Five-component systems of the diorgano(poly)siloxanes have therefore proved to be particularly suitable for many uses. Examples of such mixtures are 25–100 parts by weight of polymer or polymers of the formula II, in which R are methyl radicals, $R^1$ are vinyl radicals, n+m lies within the limits of 2,000 to 8,000 and n/m lies within the limits of 200 to 8,000, 0–50 parts by weight of polymer or polymers of the formula I, in which R and $R^1$ are methyl radicals and n lies within the limits of 2,000 to 8,000 and 0–25 parts by weight of polymer or polymers of the formula II in which R and $R^1$ are methyl radicals, n+m lies within the limits of 500 to 8,000 and n/m lies within the limits of 3 to 50, with the proviso that the sum of the amounts employed is 100 parts by weight.

According to the invention, diorgano(poly)siloxanes and finely divided silicon dioxide and if appropriate other components to be metered in are mixed, homogenized and if appropriate degassed in oscillating single-shaft pilgrim-step kneaders (1) having a total length of preferably 10 to 30 D (D=screw diameter), in particular 12 to 25 D, the speed of rotation of these screws preferably being 5–300 revolutions per minute, in particular 30 to 300 revolutions per minute. The total length can be used here as the mixing zone, but it is preferably divided into a mixing zone and a degassing zone, the mixing and degassing zones being separated, for example, by a retarding disk. However, the two zones can also be separated by two pilgrim-step kneaders connected in series, the mixing operation taking place in the first kneader and the degassing operation taking place in the second kneader.

Such pilgrim-step kneaders are also known by experts as KO kneaders (Ullmanns Encyklopädie der technischen Chemie (Ullmanns Enclcyopedia of Industrial Chemistry), 4th Edition, Volume 2, page 296, Verlag Chemie, Weinheim/Bergstrasse F. R. of Germany) or as Buss kneaders. In these pilgrim-step kneaders, the goods to be mixed can be kept at a given temperature level by heating or cooling throughout the entire mixing operation.

The diorgano(poly)siloxanes employed according to the invention are either removed from an upstream continuous polymer reactor (2), preferably likewise a pilgrim-step kneader, and passed to the mixing zone of the single-shaft pilgrim-step kneader without further intermediate storage, the stream of substance being known and freely adjustable on the basis of the amounts of reaction components metered into the polymer reactor, or pumped from storage containers, such as, for example, intermediate tanks, and suitable metering devices, such as liquid differential metering balances, into the mixing zone, preferably in the region of 0–4 D, in particular 0–2 D, of the single-shaft pilgrim-step kneader. The diorgano(poly)siloxanes are preferably fed from the polymer reactor with a delivery organ, such as, for example, a discharge screw and/or a gear pump (3), the diorgano(poly)siloxane preferably being passed over a polymer cooler (4), such as, for example, a plate cooler, before entry into the single-shaft pilgrim-step kneader. To avoid pressure losses, the distance from the delivery organ should be as low as possible here, and should preferably not exceed 10 m.

If necessary, one or more diorgano(poly)siloxanes can be fed from continuous polymer reactors and/or storage containers, as described above, to the mixing zone of the single-shaft pilgrim-step kneader in a regulated stream of material which is constant with respect to time.

The silicon dioxide used according to the invention and if appropriate other reinforcing or non-reinforcing fillers are preferably, added via differential metering balances (5) and/or feeding devices to the mixing zone of the single-shaft pilgrim-step kneader, preferably in the region of 0.5 to 10 D, in particular 2–8 D. In particularly preferred embodiments, this is effected via at least two metering points distributed over this region. Feeding devices may be cylindrical or conical vessels with built-in rotating spirals or screws, or alternatively, single or twin shaft co-rotating or counter-rotating feeding screws.

If silicon dioxide which results from wetting of finely divided hydrophobic silicon dioxide with anti structure agent is used, this wetting is carried out in continuous or discontinuous high-speed mixers (6).

Depending on the recipe, it may be necessary to incorporate agents for improving structure in the mixing zone of the single-shaft pilgrim-step kneader. This is preferably carried out via metering pumps (7), such as piston pumps, membrane pumps or gear pumps, using a flowmeter and control circuit. The agents for improving structure should preferably be metered-in in the region of the polymer metering point, that is to say preferably in the region of 0–4 D, in particular before metering-in of the silicon dioxide employed according to the invention and if appropriate other fillers used.

Another variant which is used if appropriate is the feeding-in of some or all of the agent for improving structure into the mixing zone or into the degassing zone shortly before the discharge organ, preferably in the region of 5 to 1 D in front of the discharge organ, of the single-shaft pilgrim-step kneader.

Depending on the recipe, other additives may be metered in. The place of addition and amount are not critical here, and depend on the recipe specifications.

The components metered in, depending on the recipe, are mixed, homogenized and degassed in the mixing and degassing zones. The temperature program here depends on the particular recipe. It is of advantage if the mixing and degassing zones are equipped with separate heat treatment circulations. The temperature within the single-shaft pilgrim-step kneader is preferably 20 to 280° C., in particular 80 to 220° C.

The degassing is preferably carried out in vacuo. The evacuation is preferably carried out with the aid of vacuum pumps (8), such as water ring pumps, if appropriate combined with rotary piston pumps or jet pumps. It is also possible to work with a gentle stream of entrained inert gas in the mixing and/or degassing zone. Nitrogen is then preferably used as the inert gas.

After mixing and degassing, the composition is fed to the product discharge. A discharge screw or a discharge pump is preferably employed as the discharge organ.

The composition is then preferably fed to a sieving device, for example a sieving head (9) with automatic change-over equipment. The pressure build-up needed for this is preferably achieved with extruders (10) or gear pumps.

The composition resulting from this is preferably fed to a continuous roll unit (11), such as, for example, a shearing roll extruder, for cooling to temperatures of preferably less than or equal to 100° C., in particular 40 to 100° C.

If required according to the recipe, crosslinking agents and/or pigments and/or further additives are incorporated on these roll units after cooling. These substances are preferably metered in via differential metering balances.

The compositions, which have preferably been cooled to 20 to 90° C., can finally preferably be converted into ready-to-sell goods via pressure build-up machines, such as a single-screw extruder, with subsequent shaping (12).

Although not stated explicitly above, units used in the process according to the invention can contain other constituents which are known per se, such as metering and other delivery devices, measuring and regulating devices, for example for pressure, temperature and volume flows, valves, the customary components needed for degassing and cooling, delivery and packaging devices, devices for charging the material with inert gas and devices for drying such gases.

One embodiment of the process according to the invention is outlined in the figure, it being the intension for the components of the units shown therein to give an overall view of an arrangement to be used. Depending on the dosages required according to the recipe, the components which may not be required can of course be omitted, or components can be replaced by devices having the same effect.

The numbers in the FIGURE have the following meanings:
1. Single-shaft pilgrim-step kneader
2. Polymer reactor
3. Discharge screw/discharge pump
4. Polymer cooler
5. Differential metering balance
6. High-speed mixer
7. Metering pump
8. Vacuum pump
9. Sieving head
10. Extruder
11. Roll unit
12. Shaping

EXAMPLE

An oscillating single-shaft pilgrim-step kneader (type PR 140, process length 15 D) was charged with diorganopolysiloxane via a gear pump and a differential metering balance suitable for high-viscosity media. The polymer is characterized by the following formula:

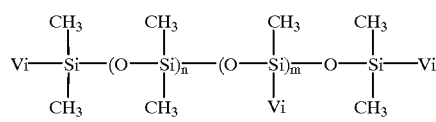

Vi = vinyl
n + m = 6,000
n/m = 3,000

Viscosity: 20,000 Pas (25° C.)

The kneader was temperature-controlled at 150° C. and the speed of rotation of the screw was adjusted to 100 revolutions per minute. After a premixing zone for the polymer of about 2 D, finely divided hydrophobic silicic acid was metered in at a process length of a further 2 D over a powder differential metering balance. Total metered amount: 30 kg/h. The tamped density of the silicic acid is 0.30 kg/l. The silicic acid metered in was homogenized with the polymer over 11 D and then discharged via a gear pump. The temperature of the composition (pilgrim-step kneader outlet) was 185° C. throughout the experiment (duration: 3 hours), and was subject to only slight variations in the range from 183–187° C. The product could be characterized by the following properties.

| | Sample after | | |
|---|---|---|---|
| | 1 hour | 2 hours | 3 hours |
| Appearance | homogeneous and transparent | | |
| Speck evaluation | good | good | good |
| Mooney viscosity DIN 53523 | 38 | 39 | 37 |
| Shore A hardness* DIN 53505 | 48 | 49 | 48 |

*After vulcanization at 165° C. (15 minutes) and subsequent heat treatment at 200° C. (4 hours). Crosslinking agent: dicumyl peroxide
Overall evaluation: positive product properties and problem-free course of the experiment.

Comparison Example

A comparison experiment was run analogously to the example on a twin-screw extruder (type Kestermann, K 86). The starting substances and throughputs were the same as those from the example, and the metering units and the gear pump for the product discharge were identical. The premixing zone for the polymer was about 5 D and the silicic acid was then fed into the kneader over a process length of about 2 D. A further 13 D was used for homogenization of the filler in the polymer. Screw diameter: 80 mm, process length: 20 D, Temperature of housing and screw: 150° C. Speed of rotation: 40 revolutions per minute The temperature of the composition was 182–194° C., with peaks up to 210° C., during the experiment (duration: 3 hours). The product can be characterized by the following properties.

| | Sample after | | |
|---|---|---|---|
| | 1 hour | 2 hours | 3 hours |
| Appearance | homogeneous/transparent slight dark coloration | not completely homogeneous/transparent | homogeneous/transparent dark coloration |
| Speck evaluation | average | average | average/poor |
| Mooney viscosity, DIN 53523 in ML(1 + 4), 23° C. | 35 | 40 | 37 |
| Shore A hardness*, DIN 53505 | 47 | 50 | 47 |

*After vulcanization at 165° C. (15 minutes) and subsequent heat treatment at 200° C. (4 hours). Crosslinking agent: dicumyl peroxide Overall evaluation:

Because of the varying intake properties of the twin-shaft machine, product properties which are not constant with respect to time resulted. The speck evaluation furthermore indicates the need for a significantly longer process length. The product discoloration apparently results from the wear on the twin-shaft machine, mainly due to friction on the screw theads and the barrel wall.

What is claimed is:

1. A process for the continuous preparation of an HTV silicone composition, which comprises mixing 100 parts by weight of diorgano(poly)siloxane which has a viscosity of 50 to 100,000 Pas at 25° C. with at least 20 parts by weight of finely divided silicon dioxide which has a tamped density of more than 0.01 kg/l in an oscillating single-shaft pilgrim-step kneader.

2. The process of claim 1, wherein the HTV silicone composition has a Mooney viscosity of 15–130 Mooney units.

3. The process of claim 1, wherein the diorgano(poly)siloxane has a viscosity of 500–50,000 Pas at 25° C.

4. The process of claim 1, wherein the finely divided silicon dioxide is pyrogenic and/or precipitated silicon dioxide.

5. The process of claim 1, wherein the HTV silicone composition comprises 100 parts by weight of diorgano(poly)siloxane, 20 to 200 parts by weight of finely divided silicon dioxide having a tamped density of more than 0.01 kg/l, 0 to 100 parts by weight of other filler, 0 to 30 parts by weight of anti-structure agent, 0 to 7 parts by weight of crosslinking agent and 0 to 30 parts by weight of other additives.

6. The process of claim 1, wherein the single-shaft pilgrim-step kneader has a total length of 10 to 30 D (D=screw diameter).

7. The process of claim 1, wherein the diorgano(poly)siloxane is metered in over the region of from 0 to 4 D and the finely divided silicon dioxide is metered in over the region of from 0.5 to 10 D (D=screw diameter) of the single-shaft pilgrim-step kneader.

8. The process of claim 1, wherein the temperature within the single-shaft pilgrim-step kneader is from 20 to 280° C.

9. The process of claim 1, wherein the composition which is discharged from the single-shaft pilgrim-step kneader is fed, after pressure build-up has taken place, via a sieving device to a continuous roll unit for cooling to a temperature of less than 100° C., where optionally, crosslinking agents and/or pigments and/or additives are added.

10. The process for the continuous preparation of the HTV silicone composition of claim 1, wherein the composition which is discharged from the kneader is fed, after pressure build-up has taken place, via a sieving device to a continuous roll unit for cooling to a temperature of less than 100° C., where crosslinking agents and/or pigments and/or additives are added.

* * * * *